Patented Apr. 28, 1942

2,281,394

UNITED STATES PATENT OFFICE 2,281,394

OXY-ESTERS OF ALPHA-BETA ACIDS AND UNSATURATED ALCOHOLS

Ben Edmund Sorenson, Upper Darby, Pa., assignor to E. I. du Pont de Nemours & Company, Wilmington, Del., a corporation of Delaware No Drawing. Application May 17, 1940, Serial No. 335,789

9 Claims. (Cl. 260—484)

This invention relates broadly to ethers of alpha beta unsaturated esters and more particularly to such oxy-esters as allyl oxy-diallyl succinate and methallyl oxy dimethallyl succinate.

In the preparation of esters of unsaturated alcohols and alpha beta unsaturated polycarboxylic acids by ester interchange, sodium or potassium alkoxides (or alcoholates) are commonly used as catalysts. In such reactions there is also used an excess of the alcohol over that theoretically required for the ester interchange. It has been found that in such ester interchange reactions a relatively low yield of the desired ester is obtained, the alcohol reacting with the alpha beta unsaturated esters formed to produce oxy-esters (or ether-ester) materials. For example in the preparation of dimethallyl maleate by ester interchange of dimethyl maleate and methallyl alcohol using metallic sodium or sodium alkoxide as the catalyst, a yield of approximately only 50% is obtained, the remainder being the oxy-ester. The normal expected reaction may be expressed by the equation:

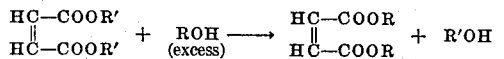

R′=methyl or ethyl. R=methallyl or other similar alcohol radical, while the secondary reaction or formation of the oxy-ester (ether-ester) may be expressed as:

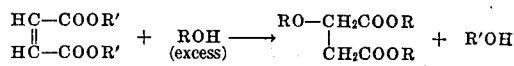

It might in general be expected that the alkali and alkaline earth alkoxides (alcoholates) used as catalysts would produce the same result. I have found, however, that this is not the case and that varying results are obtained by the use of different metals as catalysts, the other conditions of the reaction remaining substantially the same. In some instances there is produced a large quantity of the oxy-ester (ether-ester) while in others substantially none is produced. This will be more fully discussed later. Since the oxy-esters (ether-esters) possess valuable properties for certain uses and further since their separation from the ester itself involves tedious operation, a ready means of producing them is desirable.

This invention has as an object the provision of means for preparing oxy-esters (ether-esters) of alpha beta acids and unsaturated alcohols. A further object is the preparation of such oxy-esters in high yields substantially free from the ester of the alpha beta acid and the unsaturated alcohol. A still further object is a means for preparing such ether-esters economically. Another object is the preparation of the oxy-esters in polymeric form. Still another object is the preparation of polymeric resinous materials comprising the copolymerized and interpolymerized products of the oxy-esters and other polymerizable materials as drying and/or semi-drying oils, vinyl type materials, etc. Another object is the preparation of synthetic organic finishes of a new type.

Other objects will be apparent as the description of the invention proceeds.

These objects are accomplished by the following invention in which an alkyl ester of an alpha beta unsaturated dicarboxylic acid is reacted with an unsaturated alcohol in the presence of metallic magnesium as a catalyst.

The invention will be more fully understood by the following examples given by way of illustration, but not by limitation except in so far as defined in the appended claims. The parts are by weight.

Example I

| | | |
|---|---|---|
| Dimethyl maleate | 144 | parts (1 mol) |
| Methallyl alcohol | 288 | parts (4 mol) |
| Magnesium (metal) | 0.25 part | |

The dimethyl maleate and the methallyl alcohol were heated in a round bottomed flask equipped with a four-foot packed column, a distillation head and a water separator. The liquid was refluxed to dry the reactants and the water separated until the vapor temperature reached 110° C. Thorough drying is important since even small amounts of moisture tend to retard the reaction by destroying the catalyst. The magnesium, which had previously been activated by rubbing with mercury until amalgamated on the surface, was then added. The reaction mass was then refluxed and methyl alcohol withdrawn from the top of the column by maintaining the reflux temperature at 64–66° C. This yielded 81 cc. (64 parts), which is substantially the theoretical amount for complete ester interchange.

To remove the unreacted methallyl alcohol the residue was vacuum distilled at 35 mm. pressure until the liquid temperature reached 145° C. The alcohol recovered was 88 parts. The residue was then distilled at 4–5 mm. pressure.

The actual yield of crude methallyl-oxy-dimethallyl succinate was 249 parts with a boiling range of 140–160° C.

The theoretical yield based on the dimethyl maleate is 296 parts. Actual yield therefore was 84.1%.

The boiling range of the fractionated methallyl-oxy-dimethallyl succinate at 3 mm. was 150-155° C.

Acetyl number_____ 386.6
Theoretical acetyl number for methallyl-oxy-dimethallyl succinate is_____ 378.5
Specific gravity at 25° C_____ 1.0170
Refractive index nD 25° C_____ 1.4600

Example II

Dimethyl maleate_____ 576 parts (4 mol)
Methallyl alcohol_____ 1440 parts (20 mol)
Magnesium (metal)_____ 0.5 part The reaction was carried out according to the procedure described under Example I. It will be noted that the ratio of dimethyl maleate to methallyl alcohol has been increased from 1:4 as in Example I to 1:5. The magnesium catalyst used in this example was also activated by rubbing with mercury until the surface was amalgamated.

The yield of crude methallyl-oxy-dimethallyl succinate obtained was 1050 parts. The boiling range of the material was 140-160° C. (see Ex. I) at 2-3 mm. The theoretical yield based on the dimethyl maleate used is 1184 parts. The actual yield was therefore 88.5% of the possible theoretical.

Example III

Dimethyl maleate _____ 960 parts (6.67 mols)
Methallyl alcohol_____ 2400 parts (33.40 mols)
Magnesium (metal dissolved in 40 parts of methyl alcohol_____ 1 part The reaction was carried out according to the procedure described under Example I. The magnesium catalyst was prepared by dissolving the metal in dry methanol to which a few crystals of mercuric chloride had been added.

The yield of crude methallyl-oxy-dimethallyl succinate obtained was 1802 parts with a boiling range at 4-5 mm. of 148-160° C. The actual yield, based on the dimethyl maleate was 92% of the theoretical.

Example IV

Dimethyl maleate _____ 960 parts (6.67 mols)
Methallyl alcohol_____ 2880 parts (40 mols)
Magnesium (metal dissolved in 50 parts of methyl alcohol _____ 1 part The reaction was carried out according to the procedure used in Example III.

The yield obtained was 1730 parts which is 88.0% of the theoretical based on the dimethyl maleate used.

Example V

Dimethyl maleate_____ 144 parts (1 mol)
Allyl alcohol_____ 290 parts (5 mols)
Magnesium (metal —2.5% solution in methyl alcohol____ 6 parts The reaction was carried out in an apparatus of the type used in Example I.

The dimethyl maleate and the allyl alcohol (with an additional 76 parts of allyl alcohol) were dried by distillation, the water being removed as an allyl alcohol-water binary boiling at 87° C. In drying 76 parts were removed. The magnesium catalyst was then added as a solution of magnesium methylate in methyl alcohol. The reaction mixture was refluxed and the methyl alcohol formed removed by distillation at 64-66° C. until about 64 parts of methyl alcohol was obtained.

The reaction mixture was then transferred to a distillation apparatus and distilled at 35 mm. pressure to remove the excess allyl alcohol. The pressure was then reduced to 4 mm and the ether-ester distilled.

The yield obtained was 229 parts boiling at 124-136° C. at 4 mm. The theoretical yield is 254 parts making the actual yield, based on the dimethyl maleate used, approximately 90%.

The fractionated allyl-oxy-diallyl succinate possessed the following constants:

Specific gravity at 25° C_____1.0524
Refractive index nD 25° C_____ 1.4579

The time required for the reaction after the addition of the catalyst may vary from 7 to 10 hours, the variation being dependent on the type of apparatus used, size of the charge, amount of catalyst used and other conditions incident to such reactions. The selection of the proper conditions for maximum yields will be readily apparent to those skilled in the art of carrying out such reactions. The yield of the crude material will be found to vary from 84 to 92% of the theoretical available yield based on the dimethyl maleate.

The magnesium catalyst may be amalgamated by rubbing with mercury as noted in some of the examples. Further it may be activated by slight warming in a methyl alcohol solution of mercuric chloride until reaction of the alcohol and the magnesium sets in. A dry methyl alcoholic solution of magnesium methylate may also be used. The amount of catalyst used may conveniently vary from .10% to .35% based on the ester, an amount less than .10 parts not being desirably effective for ester interchange and an amount greater than .35% not being desirable since it has a tendency to decrease the amount of addition product formed.

The ratio of unsaturated alcohol to the alkyl maleate used may vary over a rather wide range but for preferred results a minimum of 4:1 should be used. Too great an excess of alcohol is not desirable for economic reasons. In addition to methallyl alcohol, allyl and similar unsaturated alcohols may be used with the magnesium catalyst to produce the ether-ester materials.

As previously noted the addition of the alcohol to the ester of the unsaturated alcohol formed in the ester interchange reaction where metallic sodium or the alcoholate is used takes place to the extent of only about 50% or less. Where metallic calcium is used as the catalyst the yield of ether-ester is approximately the same. It would be expected that magnesium would yield about the same addition but I have found that the addition is approximately 80% or more. The reason for this great difference is not readily apparent. It might be assumed that the difference was due to the alkalinity produced by the catalyst but this is refuted by the fact that both sodium and calcium are stronger bases than magnesium. On the other hand, when aluminum is used as a catalyst, as disclosed in my copending application Serial No. 335,790 issued August 5, 1941, as Patent No. 2,251,765 there is substantially no reaction to the formation of the ether-ester material. Aluminum is, of course, a weaker base than magnesium. It is apparent therefore, that the high yield of ether-ester material obtained by the use of magnesium as a catalyst is unexpected from the known facts.

The ether-ester obtained in accordance with the present invention is a monomer which can be readily polymerized by heating alone or in the presence of organic peroxides or other suitable polymerization catalysts. For polymerizing to a resin it is desirable that the material be 90-95% ether-ester, since polymers thus obtained yield films which are more flexible than films from polymers prepared from material containing more of the straight ester. The polymerization may be carried out in the presence or absence of suitable solvents. Furthermore, the ether-ester monomer may be interpolymerized with the other polymerizable materials as drying or semi-drying oils, vinyl type materials, etc.

The monomer as well as the polymer is adaptable for use as the film forming ingredient in the preparation of decorative and protective coating compositions as organic synthetic enamels, etc. The interpolymerized materials are equally as satisfactory. These materials when suitably pigmented produce enamel compositions which when applied to a suitable surface as metal, etc. and baked produce hard, tough and durable decorative and protective films. The polymeric resinous products may be used for purposes for which resins have previously been used.

It will be apparent from the foregoing that I have devised a simple and economical means for producing oxy-esters (ether-esters) of alpha beta acids and unsaturated alcohols in high yields in monomeric form which can be readily polymerized as such or interpolymerized with other polymerizable materials. The oxy-ester monomers are soluble in many of the more common organic solvents as aliphatic and aromatic hydrocarbons, esters, ketones, alcohols, and the like.

It is apparent that many widely different embodiments of this invention may be made without departing from the spirit and scope thereof, and therefore, it is not intended to be limited except as indicated in the appended claims.

I claim:

1. The process which comprises reacting an alkyl ester of an alpha beta unsaturated lower dicarboxylic acid and a lower olefinic alcohol in the presence of metallic magnesium.

2. The process of claim 1 in which the magnesium is first treated with a solution of mercuric chloride.

3. The process of claim 1 in which the magnesium is dissolved in one of the ingredients of the reaction and is added to the reaction mixture in portions during the progress of the reaction.

4. The process of reacting dimethyl maleate and an allyl alcohol which comprises refluxing a mixture thereof in the presence of metallic magnesium.

5. The process of claim 4 in which the alcohol is allyl alcohol.

6. The process of claim 4 in which the alcohol is methallyl alcohol.

7. In the process of preparing monomeric esters by reacting an alkyl maleate with an allyl alcohol, the improvement which comprises reacting the said ingredients in the presence of magnesium.

8. The process of claim 7 in which the magnesium is in the form of foil and is activated by contacting it with a solution of mercuric chloride in methyl alcohol.

9. The process of claim 7 in which the magnesium is amalgamated.

BEN EDMUND SORENSON.